(12) United States Patent
Green et al.

(10) Patent No.: US 7,947,155 B1
(45) Date of Patent: May 24, 2011

(54) PROCESS AND DEVICE FOR THE PYROLYSIS OF FEEDSTOCK

(75) Inventors: Alex E. S. Green, Gainesville, FL (US); Bruce A. Green, Micanopy, FL (US)

(73) Assignee: Green Liquid and Gas Technologies, Gainesville, FL (US)

( * ) Notice: Subject to any disclaimer, the term of this patent is extended or adjusted under 35 U.S.C. 154(b) by 0 days.

(21) Appl. No.: 12/590,963

(22) Filed: Nov. 17, 2009

(51) Int. Cl.
*C10B 47/18* (2006.01)
*C10B 47/44* (2006.01)
*C10B 43/10* (2006.01)
*C10J 3/00* (2006.01)

(52) U.S. Cl. .................. 201/2; 201/27; 201/33; 201/15; 202/90; 202/118; 202/241; 48/89; 48/119; 48/209

(58) Field of Classification Search .............. 201/2, 15, 201/18, 25, 27, 32, 33; 202/90, 117, 118, 202/241; 48/89, 101, 111, 119, 209
See application file for complete search history.

(56) References Cited

U.S. PATENT DOCUMENTS

| | | | |
|---|---|---|---|
| 3,320,152 A | 5/1967 | Nathan et al. | |
| 4,084,521 A * | 4/1978 | Herbold et al. | 110/242 |
| 4,123,332 A | 10/1978 | Rotter | |
| 4,172,431 A * | 10/1979 | Tatem et al. | 122/5 |
| 4,205,613 A * | 6/1980 | Fio Rito et al. | 110/246 |
| 4,230,451 A * | 10/1980 | Chambe | 432/72 |
| 4,278,446 A | 7/1981 | Von Rosenberg et al. | |
| 4,483,256 A | 11/1984 | Brashear | |
| 4,578,176 A | 3/1986 | Tarman | |
| 5,059,404 A | 10/1991 | Mansour et al. | |
| 5,226,927 A | 7/1993 | Rundstrom | |
| 5,266,086 A | 11/1993 | Bailey et al. | |
| 5,293,843 A | 3/1994 | Proval et al. | |
| 5,354,345 A | 10/1994 | Nehls, Jr. | |
| 5,504,259 A | 4/1996 | Diebold et al. | |
| 5,618,321 A | 4/1997 | Beierle et al. | |
| 6,048,374 A | 4/2000 | Green | |
| 6,830,597 B1 | 12/2004 | Green | |

OTHER PUBLICATIONS

A. Green, et.al., "Solid Fuel Gasifcation for Gas Turbines," ASME-IGTI Gas Turbine Conference, Jun. 1997, pp. 1-8, USA.
A. Green and J. Mullin "Feedstock Blending Studies with Laboratory Indirectly Heated Gasifiers," Journal of Engineering for Gas Turbines and Power, 1999, pp. 1-7, V 121, ASME.
A. Green and G.P. Schaefer, "What to do with CO2," Proc. Intl. Gas Turbine Inst., New Orleans, Jun. 2001, USA.
A. Green, et.al., "Multipurpose Solid Waste Disposal System for ISS," ICES, San Antonio, 2002, USA.

(Continued)

*Primary Examiner* — Jennifer A Leung
(74) *Attorney, Agent, or Firm* — David N. Villalpando

(57) ABSTRACT

This invention involves pyrolysis of feedstock by introducing carbonaceous feedstock, into a hopper and moving it into a reactor tube enclosed in an oven, generating heat within the oven that is in part transferred to the feedstock, heating it to sufficient temperature to pyrolyze the feedstock into useful volatiles and char. A Venturi system produces a negative pressure directing volatiles into a pyro-gas oven producing heat necessary for pyrolysis and generating useful excess heat. The extruded pyrolysis char has uses including charcoal fuel, soil amendments, and activated charcoal while liquids can be produced for processing into fuels. Excess heat may be used to heat water, steam, and air, and may be used in air heating and cooling systems, perform mechanical work with a Stirling engine or generate electricity on the order of 100 kW and higher. The system may be operated in a carbon neutral or even carbon negative manner, allowing sequestration of atmospheric carbon dioxide.

21 Claims, 5 Drawing Sheets

OTHER PUBLICATIONS

A. Green and S. Sadrameli "Analytical Representations of Experimental Polyethylene Yields," J. Analytical and Applied Pyrolysis, 2004, v 72, pp. 329-335, Elsevier, Netherlands.

A. Green and J. Feng "Systematics of Corn Stover Pyrolysis Yields and Comparisons of Kinetic and Analytical Representations," J. Anal. Appl. Pyrolysis, 2006, pp. 60-69, v 76.

* cited by examiner

PROCESS AND DEVICE FOR THE PYROLYSIS OF FEEDSTOCK

RELATED PATENTS

The methods disclosed in this specification will have particular relevance to patents by the primary inventor, which include the following:

Alex E. S. Green, U.S. Pat. No. 6,048,374, issued Apr. 11, 2000, "Process and device for pyrolysis of feedstock."

Alex E. S. Green, U.S. Pat. No. 6,830,597 B1, issued Dec. 14, 2004, "Process and device for pyrolysis of feedstock."

REFERENCES

This invention proposes Green Pyrolyzer Gassifier (GPG) improvements to the inventions described in U.S. Pat. No. 6,048,374 (374) and U.S. Pat. No. 6,830,597 B1 (597), which are incorporated hereby by reference, for certain heat and pyro-char applications. Lists of references to external related patents are given in 597 and 374. These improvements described herein are motivated in large part by system analysis studies of the properties of various natural fuels and the nature of their pyrolysis products [references 1-20] and the relevant books and conference proceedings led by the primary inventor (PI) as listed below.

Relevant Books or Conference Proceedings Edited by A. Green

1988 *Co-Combustion*, Vol. 4 Ed. Fuel and Combustion Technology (FACT) Div.ASME, New York, N.Y.

1989 *Greenhouse Mitigation*, Vol 7. Ed. FACT Div-ASME New York, N.Y.,

1990 *Advances in Solid Fuels Technologies*, Vol. 9 FACT div. Ed. with W. Lear, ASME New York, N.Y.

1991 *Solid Fuel Conversions for the Transportation Sector*, Ed. Vol. 12 FACT-ASME New York, N.Y.

1992 *Medical Waste Incineration and Pollution Prevention*, Van Nostrand, New York, N.Y. 2003 *Proc. Intern. Conf. on Co-utilization of Domestic Fuels (CDF)*, February 5-6, Gainesville, Fla.

Relevant Peer Reviewed Publications of AES Green

1) "Waste to Energy, Municipal-Institutional," Proc. Conference "Global Climate Change: Its Mitigation Through Improved Production and Utilization of Energy," held at Los Alamos National Laboratory, Oct. 21-24, 1991, and published by the American Institute of Physics; New York, N.Y., 1992, pp. 393-404.
2) "Thermal Conversion of Biomass," with M. Zanardi, S. Peres, Proc. Indo-US Workshop on Ecofriendly Technologies for Biomass Conversion, Tripuati, India, September 1996, pp. 57-78.
3) "Phenomenological Models of Cellulose Pyrolysis," with M. Zanardi, J. Mullin, Biomass & Bioenergy, 13,15, 1997.
4) "Cellulose Pyrolysis and Quantum Chemistry," with M. Zanardi, Int. J. Quant. Chem., 66, 1998, 219-227.
5) "Catalytic Indirectly Heated Gasification of Bagasse," with S. Peres. ASME IGTI conf, 1998, Stockholm.
6) "Feedstock Blending Studies with Laboratory Indirectly Heated Gasifiers," with J. Mullin. Proc. ASME Intl' Gas Turbine Inst. Gas Turbine Conference, June 1998, Stockholm.
7) "Thermal Disposal of CCA Treated Wood," AWMA, 92$^{nd}$ Annual Meeting, 1999, USA. Paper No. 99-938 with Daniel Nilsson.
8) "Feedstock Blending In Indirectly Heated Gasifier/Liquifiers" with Greg P. Schaefer, International Gas Turbine and Aeroengine Congress and Exhibition, Indianapolis, Ind., June 1999.
9) "What to Do with $CO_2$" presented at Turbo Expo 2001, New Orleans June 2001 with G. P. Schaefer.
10) "Pyrolysis Systematics for Co-utilization Applications", (2001) presented at the Power and Energy Systems Conference in Clearwater Fla., with P. Venkatachalam, M. S. Sankar, W. Zhang, and N. Chancy.
11) "Feedstock Blending of Domestic Fuels in Gasifiers/Liquefiers, Proc ASME, Turbo-Expo 2002, June, Amsterdam N1., with M. S. Sankar.
12) "Multipurpose Solid Waste Disposal System For ISS", ICES, San Antonio 2002, with S. Mudulodu & R. Chaube.
13) "Pyrolysis Systematics For Co-utilization Applications", IGTI, 2003, June 2003. Atlanta, with R. Chaube GT2003-38229.
14) Proc. Intern. Conf. on Co-utilization of Domestic Fuels (CDF), Ed. Gainesville Fla. February 2004, published in International. Journal of Power and Energy Systems, 24, No. 3 pgs 153-250.
15) "Analytical Representations of Experimental Polyethylene Yields", (2004) with S. M. Sadrameli, J Analytical and Applied Pyrolysis 72, 329-335.
16) "Analytical Model of Corn Cob Pyrolysis" (2006) Biomass and Bioenergy, with J. Feng Vol 30, 486-492.
17) "Systematics of Corn Stover Pyrolysis Yields and Comparisons of Kinetic and Analytical Representations" Journal of Analytical and Applied Pyrolysis, (2006) Vol 76, 60-69 with Jie Feng.
18) "Solid Waste to Energy By Advanced Thermal Technology (SWEATT)" Encyclopedia of Energy, Francis and Taylor, London 2007.
19) "Peat Pyrolysis and the Analytical Semi-Empirical Model, 2007, with J. Feng in Energy Sources, Part A 29-1049-1059 Taylor and Francis, London 2007.
20) "Modeling representations of canola oil catalytic cracking for the production of renewable aromatic hydrocarbons" with S. M Sadrameli Journal of Analytical and Applied Pyrolysis, 2008.

Additional External References Cited
21) "A unified correlation for estimating HHV of solid liquid and gaseous fuels" S. Channiwala, & P. Parikh Fuel UEL, 2002, 1051-1051-1064.
22) "A handful of carbon" J. Lehmann Nature Vol 447 10 May 2007 143-144.
23), "Biochar for Environmental Management: Science and Technology", 1) Lehmann, J. and S. Joseph, eds, Proc. Newcastle UK conference, Earthscan Publishers Ltd., 2009.
24) "Amazonian Dark Earths" Woods, W. I., Teixeira, W. G., Lehmann, J., Steiner, C. WinklerPrins, A. and L. Rebellato, eds.: Wim Sombroek's Vision, Springer Publishers, 2009.
25) "Consider upgrading pyrolysis oils into renewable fuels" J. Holmgren et.al. Hydrocarbon Processing September 2008, 95-103.

BACKGROUND OF THE INVENTION

The present invention describes improvements for many applications of previous inventions as described in U.S. Pat. No. 6,048,374 (374) and U.S. Pat. No. 6,830,597 B1 (597). The improvements presented herein are in part the result of many tests with process development unit (PDUs) of devices modified in various degrees from those described in 597 and 374. In large part the improvements reflect the result of system analysis studies particularly those using the PI's analytical semi-empirical model (ASEM) of pyrolysis of carbohydrate materials.

Tests carried out during the development of green pyrolyzer gasifier (GPG) systems have used electric ovens, charcoal ovens, oil ovens and gas ovens to provide the heat of pyrolysis. Most of the earlier tests focused on generating a clean gas to be used with small scale gas to electricity generators. However, after extensive experimentation with such systems it became clear that when using a pyrolysis gas fired motor generator to produce electricity, the output/input (O/I) is not favorable at this time. This is largely due to the inefficiency or high cost of currently available small scale gas to electricity converters. Mass and energy balance calculations, however, indicate that by using the pyro-volatiles, or pyro-chars to provide the heat of pyrolysis, a favorable heat power O/I can be obtained. Experimental tests with char heating and gas heating for feedstock pyrolysis have indicated that heating with the volatiles is simpler than heating with the char, and furthermore the collected char is a valuable product.

Figure 1A:
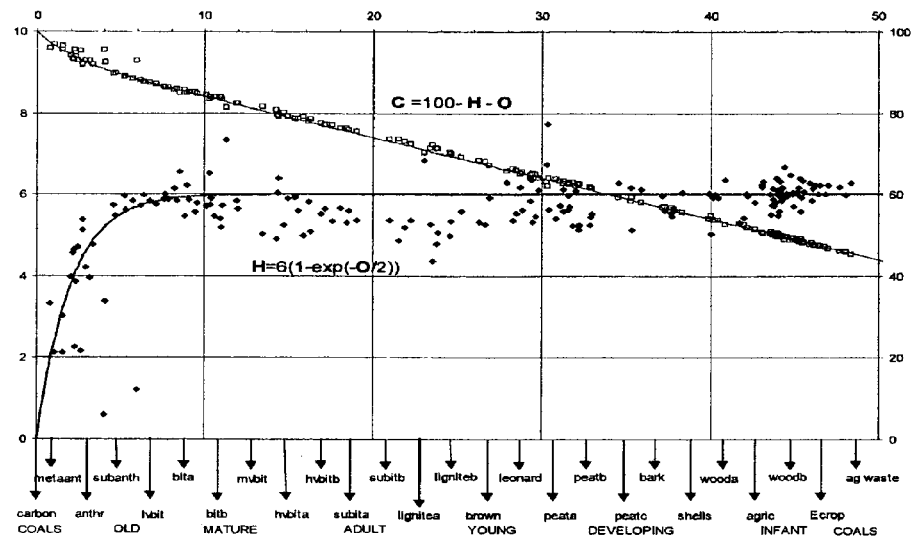
FIG. 1 illustrates ultimate and proximate analysis data vs oxygen weight percentages [O] for natural substances along nature's coalification path corrected to dry, ash, sulfur, and nitrogen free conditions: a) [H] (left scale) and [C] (right scale). The upper data shows [C] vs [O], b) Total volatiles and fixed carbon vs [O] for 185 DASNF carbonaceous materials (squares) from proximate analysis. The smooth curve through the data points is VT=62([H]/6)([O]/25)$^{1/2}$, c). Higher Heating Values (HHV) of 185 carbonaceous materials (corrected to DASNF) vs [O]. The smooth curve represents HHV=34.9–0.45[O]+0.83[H] in MJ/kg. All smooth curves use the approximation [H]=6{1-exp-[O]/2}.

The system analysis type studies of ultimate and proximate analyses of materials along nature's coalification path [6, 8-13] have pointed to the importance of the oxygen weight percentage [O] and how the hydrogen [H] and carbon [C] are correlated with [O] among natural fuels. FIG. 1a illustrates the results of a large compilation of ultimate analysis [H] vs [O] and [C] vs [O] data obtained from many sources in the coal and biomass literature. Here the data has been corrected to dry, ash, sulfur and nitrogen free (DASNF) materials and ignores trace (ppm) elements. The formula [H]=6{1-exp-[O]/2]} provides an approximate smooth representation of the overall trend of [H] with [O] for these substances. For DASNF material [C]=100–[H]–[O]. The curve through the [C] vs [O] data points assumes this smooth [H] vs [O] relationship.

Figure 1B:
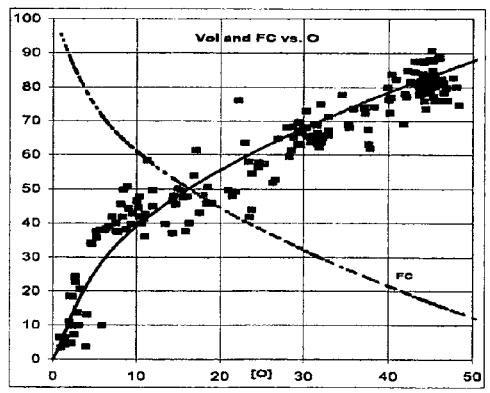

FIG. 1b shows the systematic of total volatile (VT) vs [O]. for DASNF materials. It is reasonably well represented by VT=62{([H]/6)*([O]/25)$^{1/2}$}. For most plant matter [O] is around 45% and experiment or a simple calculation shows that the total volatiles released in high temperature pyrolysis is in the 80% range. Thus pyrolysis of plant matter is essentially a direct form of gasification. The fixed carbon, FC (FC=100–VT), is thus typically 20%. In contrast for bituminous coal [O]~10% and our formulas give VT~40% and FC~60%. Table 1 lists some thermal properties of fuels along nature's coalification path.

Table 1 Properties of Fuels along natures coalification path. [C], [H], [O], VT and FC are in weight percentage. HHV is in MJ/kg. RelchR denotes relative char reactivity.

| Name | Ultimate Analysis | | | Proximate Analysis | | | Other properties | | | | |
| --- | --- | --- | --- | --- | --- | --- | --- | --- | --- | --- | --- |
| | [C] | [H] | [O] | HHV | VT | FC | Dens | E/vol | RelchR | H, OH | ORank |
| Anthracite | 94 | 3 | 3 | 36 | 7 | 93 | 1.6 | 58 | 1.5 | v. low | 3-O |
| Bituminous | 85 | 5 | 10 | 35 | 33 | 67 | 1.4 | 49 | 5 | low | 10-O |
| Sub Bitum | 75 | 5 | 20 | 30 | 51 | 49 | 1.2 | 36 | 16 | med | 20-O |
| Lignite | 70 | 5 | 25 | 27 | 58 | 42 | 1 | 27 | 50 | interm | 25-O |
| Peat | 60 | 6 | 34 | 23 | 69 | 31 | 0.8 | 18 | 150 | high | 34-O |
| Wood | 49 | 7 | 44 | 18 | 81 | 19 | 0.6 | 11 | 500 | v. high | 44-O |
| Cellulose | 44 | 6 | 50 | 10 | 88 | 12 | 0.4 | 9 | 1600 | v v. high | 50-O |

Figure 1C:
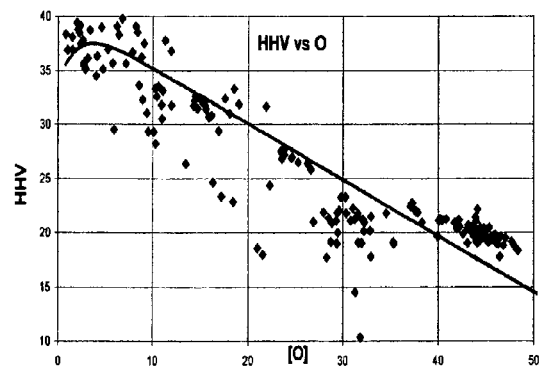

Higher heating values (HHV) are usually reported along with proximate analysis. FIG. 1c displays HHV data for the compilation of materials after correction to DASNF cases. Most points within this noisy data can be fit within a few percent by HHV=34.9–0.453[O]+0.829[H] in MJ/kg. or
HHV=15.00–0.194[O]+0.356[H] in Btu/lb.

This form of DuLong's formula is simplified from that used by Channiwala and Parikh [21].

The rule HHV=15–[O]/5+[H]/3 in Btu/lb should be good enough for ball park purposes. The smooth curve in FIG. 1c shows the trend of the HHV vs [O] curve when the smooth [H] vs [O] relationship is used. In applying these HHV formulas note that most plant materials have [H] near 6% whereas [O] is near 45%. Thus the negative [O] term generally has a greater influence than the positive [H] term.

FIG. 1b and the formula VT=62{([H]/6)*([O]/25)$^{1/2}$} indicate that high [O] materials give high percentages of volatiles. However, this DuLong formula assigns low heating values to high [O]'s [12,13]. Blending feedstock to achieve favorable properties for pyrolysis could have a number of advantages [11-14]. Air blown partial combustion is a long established and still prevalent approach to biomass gasification. Unfortunately the HHV of its gaseous product is not only energetically reduced by the air's 20% oxygen but even further reduced by dilution with air's 80% non-energetic nitrogen so that the product is a low HHV producer gas. When pyrolysis is taken as the route for conversion of solid biomass the $CO_2$ and $H_2O$ pyrolysis volatiles without energetic value are mainly released at lower temperatures. In the improvements described herein, these non-energetic volatiles can serve as assets.

Figure 2:
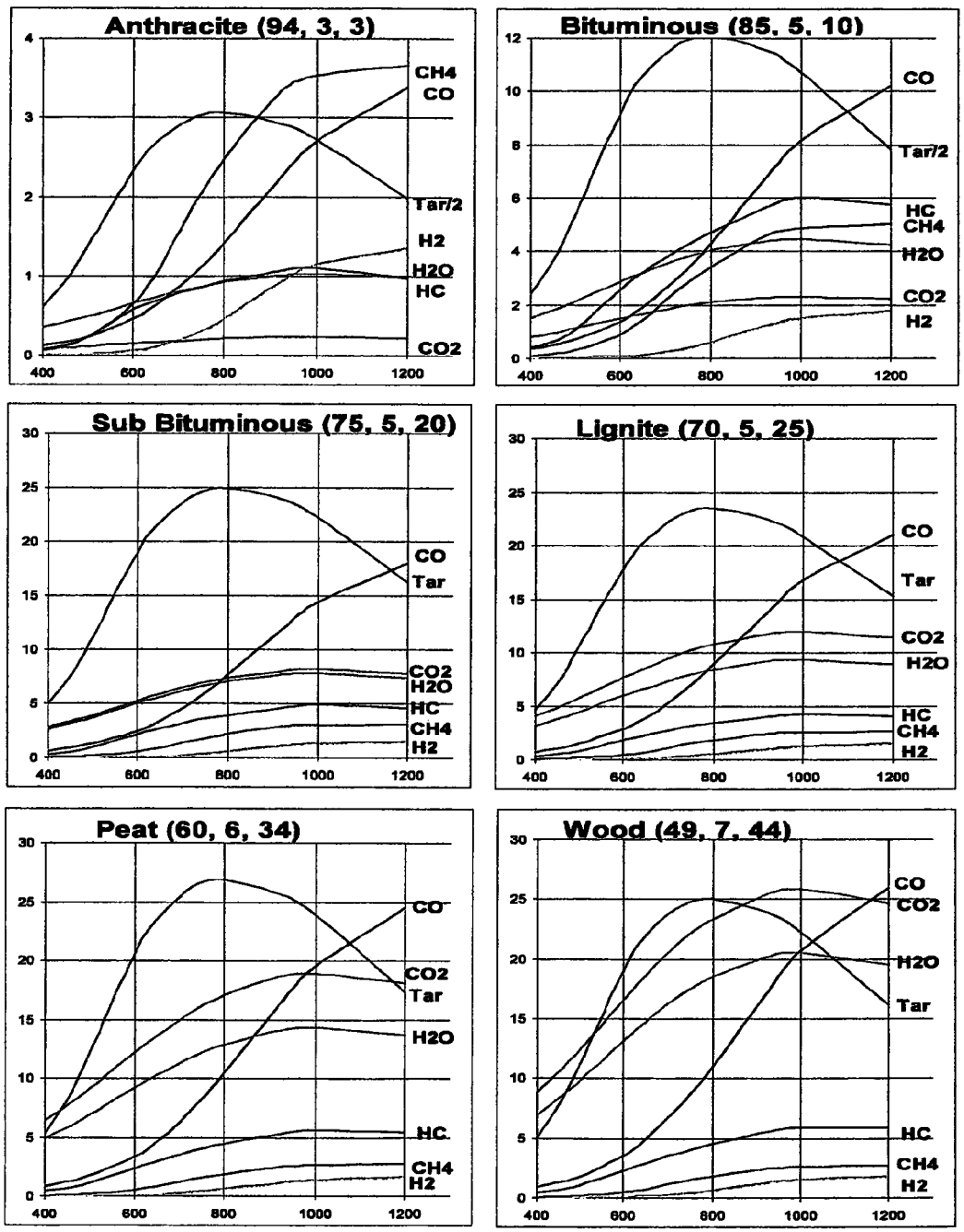
FIG. 2 presents analytical semi-empirical model (ASEM) projections of approximate yields (in wt %) of major gaseous components and tars (condensable volatiles) vs. temperature (in ° C.) from pyrolysis of anthracite, bituminous, sub-bituminous, lignite, peat and wood from studies with [C], [H], and [O] as shown. HC ->hydrocarbon gasses, Tar ->condensables.

The present invention is in large part based upon the teachings of an analytical semi-empirical model (ASEM) [13-20] that systematizes pyrolysis yield data extracted from the technical literature or measured by the PI's group. FIG. 2 illustrates examples of ASEM results for six representative solid materials along nature's coalification path [13]. The numbers on top of each box are the weight percentages (wt %) of carbon, hydrogen and oxygen, after correcting to dry, ash, sulfur, and nitrogen free (DASNF) conditions. One should note the scale changes and the fact that as the oxygen wt % goes up the yields of $CO_2$, $H_2O$, CO and Tars go up sharply. Here HC mostly stands for the sum of $C_2$-$C_4$ gaseous members of the paraffin, olefin, acetylene, diene, aldehyde and ether families. The Tars stand for the $C_5$ and higher liquid and solid members of hydrocarbon families plus hundreds of oxygenated compounds (carbohydrates) that condense at standard temperatures. Providing approximate yields of these many products in analytic forms useful for engineering applications has been the goal of ASEM studies.

Figure 3:
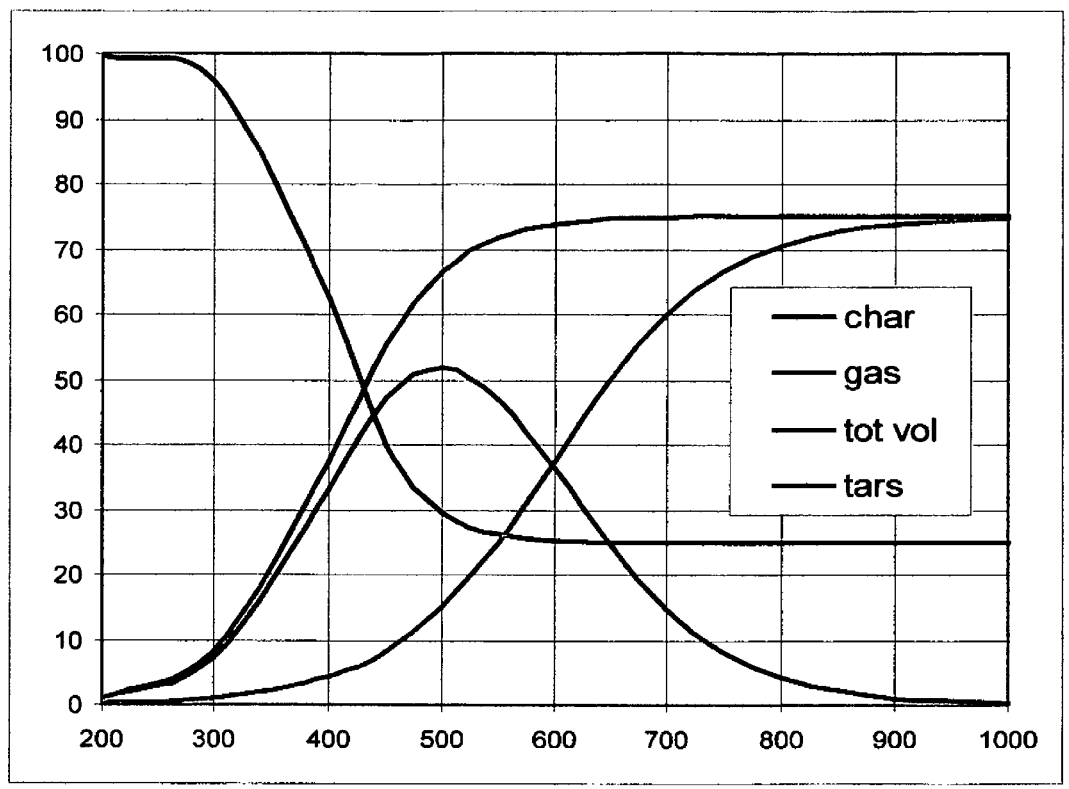
FIG. 3 represents ASEM projections of typical pyrolysis yields of char, total volatiles, non-condensable volatiles (gas) and condensable volatiles (tars) vs temperature for lignocellulosic (biomass) materials.

FIG. 3 illustrates typical char, tar and total gas pyrolysis products versus temperature curves for woody materials corrected to DASNF cases. The char yield is then primarily the residual carbonized feedstock after the pyrolysis volatiles are driven off. The volatiles consist of the sum of non-condensable volatiles (gases) and volatiles that condense at standard temperature (sometimes designated as tars). For the temperature used with GPGs, the condensable volatiles are mainly liquid carbohydrates or hydrocarbons at standard temperature, although some are solids like waxes and tar-like materials.

The need for renewable sources of fuels for the transportation sector and the need to mitigate climate change have been strong motivations for the development of GPG technologies. From the GPG beginnings in 1996, char products have been saved with the thought that they could serve as valuable soil additives. Pyrolysis char, a bi-product of GPG type of wood pyrolysis, has recently captured the attention of agronomists, environmentalists and economists in a rapidly growing International Bio-char Initiative (IBI) [22-24]. IBI looks upon cropland sequestering of $CO_2$ as an important opportunity to mitigate climate change. Thus the need for large central and small distributed scale pyrolysis systems to convert waste from fast growing plant material to bio-char might soon be widely recognized. The IBI identifies how this agricultural-thermo-technology approach can provide a low cost method of pumping $CO_2$ from the atmosphere and, sequestering it in long lasting black fertile cropland soils such as *Terra Preta* de Indio found in South America. It should be noted that whereas nature takes some 100 million years to make coal, a GPG converts biomass to bio-char in minutes. Pyrolysis converters of waste from high yield forestry and agriculture could provide a solar energy driven pump system to convert atmospheric $CO_2$ into longed lived carbon amendments that can make very productive black soils. Indeed such an overall system of growing plants and thermally extracting its stored solar energy and a bio-char product, rather than be simply carbon neutral, could be the best possibility for achieving carbon negative. Bio-char has two main benefits: the extremely high affinity of nutrients to bio-char (adsorption), and the extremely high persistence of bio-char (stability) [22-24].

An advantage of the GPG is that its operator can control several operating parameters that influence char characteristics. For example, by controlling the auger rotation rate one can control the residence time of pyrolysis that usually gives something between slow and fast pyrolysis and influences the properties of the bio-char. Controlling the excess air used in the gas oven is one of several ways to control the temperature applied to the feedstock. Controlling the moisture content of the feedstock is an important way of influencing the char quality as well as the oven temperature. Blending various other organic or selected inorganic substances in the feedstock can strongly influence char quality. In the improved GPG, a small flight pitch is typically used at the bottom of the feedstock hopper and in the entrance half of the reactor. A larger flight pitch is used in the exit half of the reactor. The small flight pitch when full provides a useful block to the intrusion of air from the open feedstock hopper or the escape of pyro gas out of this entrance. The emptier long pitch flights near the exit of the reactor provide a hot chamber for the interaction of the char with the hot $H_2O$ in the pyro gases that arise as pyrolysis products or from feedstock moisture. The unfilled reactor exit flights facilitate the passage of the pyro-volatiles to the gas oven. The water-char reactions can be written as

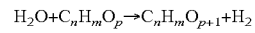

$$H_2O + C_nH_mO_p \rightarrow C_nH_mO_{p+1} + H_2$$

which is a generalization of the well known steam gasification reaction $H_2O + C \rightarrow CO + H_2$. The net effect is the oxygenation of the char and release of gases (CO plus $H_2$) from the char particle producing thereby not only a better gas but also more pores in the char. The intimate contact of the hot pyro-gas with the hot volatizing feedstock on the exit side of the GPG reactor also fosters high temperature $CO_2$ char reactions that can be written as $CO_2 + C_nH_mO_p \rightarrow C_nH_mO_{p+1} + CO$. This is a generalization of the well known Boudouard reaction, $CO_2 + C \rightarrow 2CO$.

In effect, in the improved GPG an auger flight pitch arrangement is used to foster useful high temperature reactions with two big pyrolysis products ($H_2O$ and $CO_2$) that usually are a problem in other pyrolysis arrangements. In the GPG they increase the pyro-gas yields and foster pore development in the emerging char. The char can serve as charcoal fuel, as a bio-char type soil amendment or, with more complete pore development, as activated carbon.

Studies of the pyrolysis of corn stover provide a good illustration of the usefulness of the ASEM in coping with the complexity of pyrolysis product yields for biomass type feedstock. A large body of experimental corn stover pyrolysis yields was measured with a Pyroprobe-FTIR system at Taiyuan University of Technology (TUT). They were made using a wide range of temperatures (T) and heating rates (r). A paper by Green and Feng [17] organized this data using a special case of the analytical semi-empirical model (ASEM)

$$Y(T,r) = W/\{1 + \exp(To - T)/D\}^2 \text{ where } W = Wa + Wb \ln r,$$
$$\text{and } To = Ta + Tb \ln r$$

Table 2 provides a small number of adjusted parameters that, with the formulas, give a reasonable account of the massive body of experimental data. This set of corn stover data was also organized with a traditional kinetic model (Arrhenius reaction rates) and comparisons were made between the two models. From the viewpoint of engineering applications of pyrolysis the ASEM proved simpler to use and more robust. In addition to the parameters for $H_2O$, $CO_2$ and CO, Table 1 gives the ASEM model parameters for 2 families of hydrocarbons and 5 families of carbohydrates.

TABLE 2

| Family | Corn Stover parameters | | | | |
|---|---|---|---|---|---|
| | Ta | Tb | Wa | Wb | D |
| $CO_2$ | 473 | 21.3 | 6.65 | −0.54 | 155 |
| $H_2O$ | 503 | 16.1 | 2.13 | −0.23 | 135 |
| CO | 487 | 20 | 6.5 | −0.56 | 160 |
| paraffin | 545 | 17.8 | 3.13 | −0.3 | 115 |
| olefin | 571 | 44 | 1.85 | −0.21 | 145 |
| carbonyl | 423 | 30.5 | 4.82 | −0.45 | 115 |
| ether | 471 | 29.6 | 5.16 | −0.5 | 135 |
| aldehyde | 461 | 25.4 | 4.65 | −0.31 | 125 |
| alcohol | 507 | 22.9 | 5.25 | −0.39 | 165 |
| phenol | 519 | 21.5 | 4.48 | −0.32 | 165 |

The paraffin family ($C_nH_{2n+2}$) that consists of $CH_4$, $C_2H_6$, $C_3H_8$, $C_4H_{10}$, $C_5H_{12}$ etc. might also be considered to include $H_2$ (n=0). The olefin family i.e. $C_nH_{2n}$, includes $C_2H_4$, $C_3H_6$, $C_4H_8$, $C_5H_{10}$, etc. Only seven families were measured in the Corn Stover study. Families identified in other ASEM studies include, acetylenes, dienes, formic acid, BTX aromatics, PNA, guaiacols, syringols. and sugars. References 11-15 and 20 give approximate formulas for the yields of individual family members. It cannot be over emphasized that pyrolytic reactors produce a very complex volatile brew whose detailed constituency is still beyond the predictive capability of today's science. Nevertheless, the phenomenological ASEM has served as an essential guide to the improvements of the GPG and its applications.

In this latter regard we might note that the improved GPG form lends itself to the production of activated carbon in a variety of ways. Firstly it makes use of pyrolytic water and carbon dioxide products for improved char formation. It is also simple to augment the water if needed by blending with damp feedstock. The operator can also augment the carbon dioxide by blending the feedstock with substances the release carbon dioxide at low temperature. Finally it is simple to blend the feedstock with inexpensive catalysts that foster the activation process.

While feedstocks suitable for pyrolysis include waste and agricultural materials such as wood chips, sawdust, granulated agricultural residues or energy crops, pine bark chips, pine needles, oak leaves, cogon grass, Christmas tree chips, football game waste, MRE waste, food court waste, old roof shingles, tire chips, solar dried sewage sludge, chicken or pig or cow manure, horse bedding, rat bedding, dried eutrophied lake muck and similar waste, blending of feedstock in the improved GPGs opens up a number of other GPG system applications. For example Green and Schaefer [9] have examined the conversion of lignite to useful soil additives by oxygenation with $CO_2$. The improved GPG arrangement devoid of lock hoppers readily facilitate blending materials such as wood chips that give high $CO_2$ pyrolysis yields with coal or lignite so that the lignite product comes out oxidized like Leonardite or Humalite, that are known to be valuable soil additives [9].

DETAILED DESCRIPTION OF THE INVENTION

Figure 4:
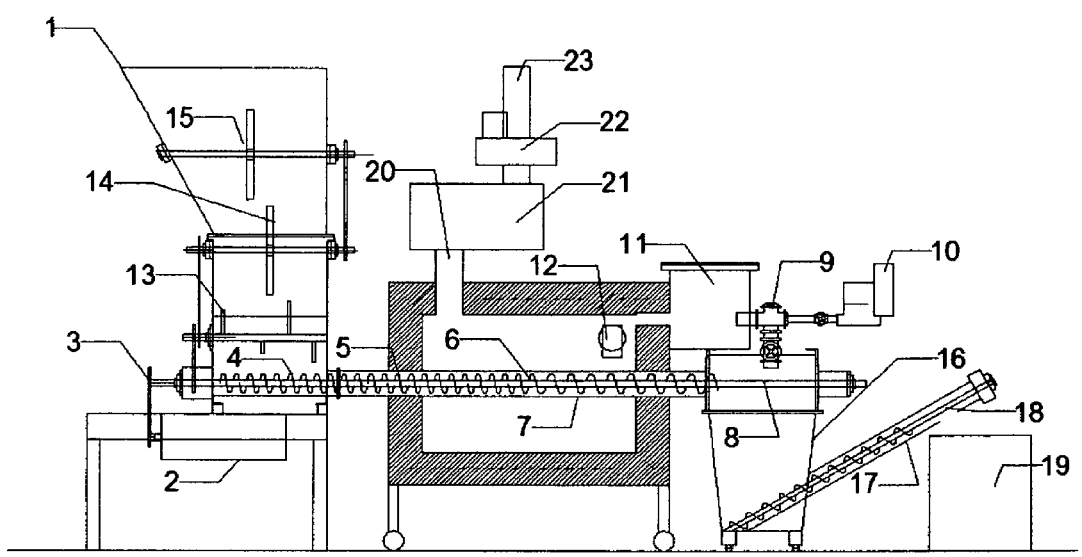
FIG. 4 Illustrates a cross section of a gas oven GPG system.

FIG. 4 shows a form of the GPG consisting of four major components
1. a hopper system to accept and store feedstock input and help block air from entering the system and pyro-gas from leaking out.
2. an auger reactor system to accept feedstock from the hopper, transport it to the oven where it is heated to high temperatures to form volatiles and char. FIG. 4 is a GPG form intended for mobile applications. Here the flow of feedstock is downward in the feed hopper, horizontal in the reactor, and then downward as char in the char receptor. Material flows, as illustrated in patents 374 and 597, are all downward but in the embodiment shown in FIG. 4, the reactor is horizontal to lower the height of the machine, which does not change the essential GPG pyrolysis processes.
3. a gas oven fired by volatiles released at the exit of the reactor that are transported via a pressure air blower-Venturi arrangement that also provides some of the combustion air. A propane or natural gas burner is first used to heat up the system but reduces/turns off the external gas when at operating temperature while continuing to supply combustion air for the pyro-gas and excess air for temperature control of the reactor. The overall oven system could include an extra air blower for temperature control
4. a char receptor-char auger extraction system leading to an external open hopper while blocking air from entering the char system and pyro-gas from leaking out.

It is important to note that in the event that natural gas is inexpensive (approximately $3-5/mmBtu) and liquid fuels are expensive (approximately $20/mmBtu), it may be advantageous and economical for the natural gas start up burner to be run continuously to provide pyro-heat, and the volatiles released at the exit of the reactor be extracted for off-site upgrading to transportation fuels [25].

In more detail, the important components as labeled in FIG. 4 are 1) the feed hopper system, 2) the main motor drive, 3) the main auger gear and drive shaft, 4) the reactor auger's short pitch flights in the feed hopper trough, 5) the short pitch initial flights of the reactor auger, 6) the transition to the longer pitch flights of the reactor auger, 7) the high temperature cylindrical reactor, 8) the reactor auger's end shaft as connected to its end bearing, 9) a Venturi-transfer channel that sucks the pyro-gas upward and injects it into the gas oven by means of 10) a pressure blower, 11) a pre-combustion chamber that starts the burn of the volatiles. 12) a burner mounted on the side of the oven (depicted in FIG. 4 as the side facing the reader) that is used to start up the system, 13), 14) and 15) represent stirring bars to break up bridges or worm holes that tend to form in hoppers filled with irregular particles. 16) denotes the char receptor, 17) the char extraction auger 18) gas plug and char exit region, 19) final char output hopper that can take on various forms depending upon the planned use of the chars and the processing and safety measures that are needed with some chars, 20) the oven exhaust pipe, 21) a boiler or heat exchanger to makes use of the excess heat generated by the oven, 22) illustrates an induced draft fan that when needed, provides extra suction to draw the pyro-volatiles into the oven, and 23) is the final chimney.

Figure 5:
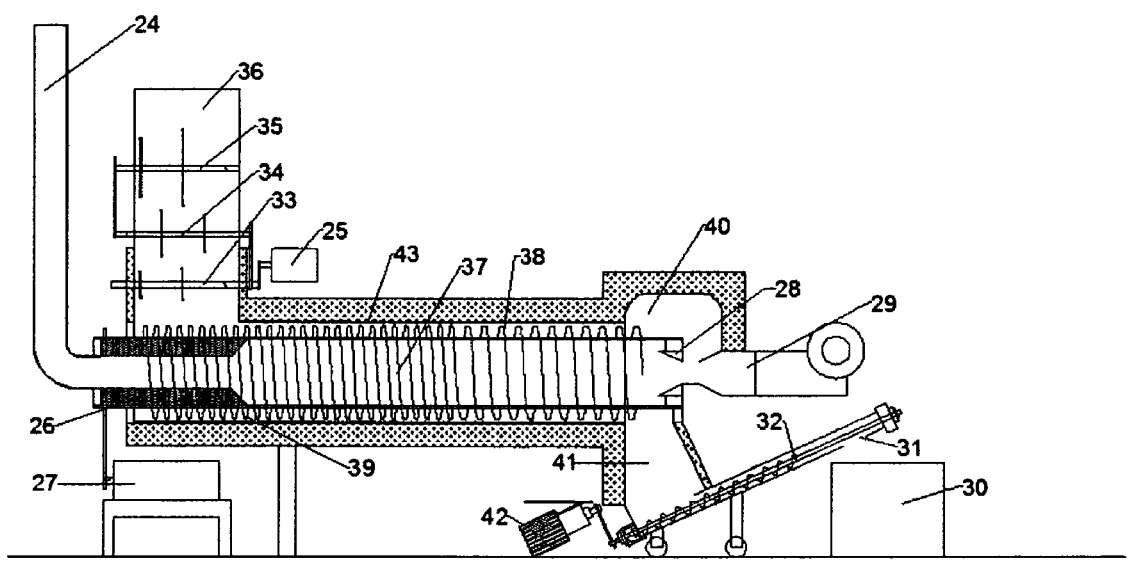
FIG. 5 Illustrates a gas oven annular GPG (AGPG) scaled up for greater throughput

Scaling up a GPG to a higher throughput than can be achieved with a simple auger was addressed in patents 374 and 597. The vision was a system with multiple reactors but common input hopper, oven and output system. The reason for not simply using an auger and reactor with larger diameters was that the heat transfer time from the outside of the reactor through the poorly conducting biomass would increase in a non-linear fashion and thus the output would not directly scale up. Unfortunately, the mechanical complexity of a multiple auger GPG system goes up rapidly with the number of reactors. Our improved GPG concept was in part motivated by our previous use of a pipe with a small inner diameter as an auger shaft with the pipe serving to transport gas. (see FIG. 3 in 374 and in 597). In the improved/advanced/annular GPG scaling up is accomplished by making the auger shaft a pipe whose inner diameter is large enough so that the pipe serves as both the oven and provides a larger heat transfer surface for the feedstock that is transported in a thin annular auger surrounding the rotating pipe oven. FIG. 5 shows such an arrangement. It retains much of the mechanical simplicity of FIG. 4 but potentially facilitates much greater feedstock throughput. We have developed and tested a formula for V, the transport volume per turn of a full annular flight:

$$V=(\pi/4)(D_a^2-D_s^2)P-t_h(D_a-D_s)(P^2+(\pi^2 D_s^2))^{1/2}/2$$

where $D_a$ is the diameter of the auger, $D_s$ the diameter of the pipe shaft, P is the pitch and $t_h$ the average flight thickness. Together with measured bulk densities and the rpm settings, this formula has been very useful estimating the potential throughput of AGPG (GPGs with annular or advanced augers). With this formula it is found that a reasonably sized annular system should be able to exceed the transport volume of a comparably sized multi-reactor system. Indeed a factor of ten increase or greater in throughput is possible on this basis. Mechanically such a system as illustrated in FIG. 5 consists of the same four major components, with the feed hopper and char receptor systems enlarged but otherwise unchanged. The reactor-auger and oven systems as shown in FIG. 5, while functionally unchanged, are physically modified to accommodate the larger feedstock-throughput, A further increase in throughput would be possible by also applying gas heat to the surface of the outside stationary pipe surrounding the annular pipe auger with several possible heat transfer arrangements.

In more detail the components of the annular GPG (AGPG) are 24) the flue gas pipe, 25) the motor drive for agitators, 26) ceramic insulation, 27) the reactor auger motor drive, 28) Venturi-transfer channel that sucks the pyro-gas and injects it into the pipe oven, 29) pressure blower and burner system, 30) final char output hopper, 31) char plug and exit, 32) char auger, 33), 34), and 35) stirring bars (agitators) to break up bridges or wormholes, 36) the feed hopper system, 37) main auger surrounding rotating pipe oven, 38) the longer pitch flights of the reactor auger, 39) the reactor auger short pitch flights, 40) pyro-gas exit, 41) char receptor, 42) char auger motor drive, and 43) outer cylinder of reactor-auger.

Not illustrated in FIGS. 4 and 5 are the sensor, control and automation systems of GPGs to minimize operator tasks. These would: a) manage the warm up sequence to bring the temperature up to that desired for the reactor (in the range 500-1100° C.) and possibly schedule the valve opening and closing sequence to transfer the oven from start-up gas to pyro-gas; b) adjust the reactor rpm to process the feedstock at the desired temperature-time sequence; c) periodically reduce the reactor rpm and/or increases the Venturi blower or burner blower air so as to move the pyrogas flame front to the vicinity of the jet exit thereby burning out any char or tar build up in the reactor exit to oven pyrogas transfer region; d) co-ordinate the filling rate of the input feed hopper so that channels do not develop for significant air flow to enter the feed hopper or for pyrogas to escape from the feed hopper; e) co-ordinates the char exit auger with the feed auger to help block the passage of pyrogas out of the char exit or air into the char exit and avoid excessive char build up in the char receptor; f) steps for applying water, $CO_2$ or catalyst treatment to the exiting char for safety purposes or for enhancing its utility as a fuel, soil amendment or as activated carbon and/or g) transfer the system to a partial liquid fuel production mode in which some of the volatiles transferred to a pyroliquid collection system and the permanent gases are returned to the oven for pyroheat generation Although some preferred embodiments of the GPG system of the present invention have been listed explicitly, there are many embodiments of our invention claimed that are simple variations of our basic invention herein disclosed that will be obvious to those skilled in the art/science of pyrolysis.

The invention claimed is:

1. A method for the pyrolysis of feedstock comprising the steps of
   A) selecting a feedstock suitable for pyrolysis;
   B) supplying said feedstock into an open feed hopper;
   C) introducing said feedstock into a reactor tube, and moving said feedstock therethrough by means of a rotating primary auger;
   D) heating said feedstock within said reactor tube to a sufficient temperature such that pyrolysis of the feedstock occurs to produce volatiles and carbonized feedstock that react at high temperatures;
   E) collecting the residual carbonized feedstock exiting the reactor tube by gravity into an inner char receptor vessel wherein a Venturi effect is created by a Venturi system driven by a pressure air blower;
   F) extracting the char through a char channel via a char auger that, together with said char receptor vessel, delivers said char to a final char output hopper while blocking the flow of air inward or pyro-volatiles outward;
   G) directing said volatiles by said Venturi effect through a volatiles transfer region and into a combustion chamber or a gas oven that provides direct thermal contact with said reactor tube such that heat generated by combusting said volatiles within said combustion chamber or gas oven is transferred to said feedstock in said reactor tube through the wall of said reactor tube to provide heat for pyrolysis; and
   H) periodically reducing the rotational rate of the primary auger and/or increasing the air from the pressure air blower or a burner blower to move the flame front to the region connecting the exit of the reactor tube with the combustion chamber or gas oven so as to burn out any carbon or tar deposits in the volatiles transfer region.

2. The method of claim 1 wherein the maintenance of the open feed hopper level and a short initial flight pitch of said rotating primary auger blocks air from entering the feed hopper, and the educing action of the Venturi system driven by the pressure air blower insures that the hot volatiles and air flow only to the combustion chamber or gas oven to provide indirect heat to the reactor tube and useful extra heat, thus eliminating the need for an external heat source and an input lock hopper.

3. The method of claim 1, further comprising the step of extracting said carbonized feedstock from the bottom of said inner char receptor vessel with a secondary auger at a rate that maintains the height of said carbonized feedstock and the short pitch in the latter part of the char auger are sufficient to provide resistance that, together with a plug created at the exit tube of said char auger in a zone devoid of flights, prevents the flow of said volatiles out of the char channel, and any flow of air into the char system, eliminating thereby the need for an output lock hopper.

4. The method of claim 1 further comprising the step of incorporating a heat exchanger in the outlet of said combustion chamber, said heat exchanger serving to transfer heat from the oven exhaust gasses to water flowing through a coil producing hot water or steam.

5. The method of claim 4 further comprising the step of controlling the height of the feedstock in the open feed hopper by adjusting the input and output rates of said open feed hopper so that the feedstock column and the filled flights of said primary auger block the flow of pyrolysis gasses into the feed entrance system, thereby eliminating the need for a feedstock entrance lock hopper.

6. The method of claim 1 wherein hot water vapor from feedstock moisture and hot water vapor and carbon dioxide pyrolysis products released at the lower temperatures in the first half of the reactor are raised to higher temperatures and reacted with the char in the second half of the reactor-auger promoting oxidation reactions leading to additional pyro gases and the further development of pores in the residual char that promote its usefulness as bio-char or activated carbon.

7. The method of claim 6 wherein non-toxic catalysts are blended into the feedstock to promote the development of pores so that the char can serve as activated carbon for specialized applications.

8. The method of claim 1 wherein the said heat is provided by a natural gas burner which is continuously used to provide pyro-heat, and said volatiles are extracted from a second outlet near the reactor tube exit and inner char receptor vessel into a separator that condenses and collects the pyro-ligneous liquids and directs the pyro gasses into the gas oven to reduce the external gaseous fuel needs.

9. The method of claim 8 where said pyro-ligneous liquids are transported offsite for upgrading into transportation fuels.

10. The method of claim 1 wherein said rotating primary auger is an annular auger containing therein a hollow tube, and said combustion chamber or gas oven is located with said hollow tube, thereby providing a large heat transfer surface to said feedstock traveling through said reactor tube, permitting thereby a higher output of heat and char where the transport volume, V, can be calculated by the equation $$V=(\pi/4)(D_a^2-D_s^2)P-t_h(D_a-D_s)(P^2+(\pi^2 D_s^2))^{1/2}/2$$

where $D_a$ is the diameter of the auger, $D_s$ the diameter of the pipe shaft, P is the pitch and the average flight thickness.

11. The method of claim 10 wherein additional heat is applied to the exterior surface of said reactor tube.

12. The method of claim 11 wherein said additional heat is generated by burning or heating a gas.

13. A device for the pyrolysis of feedstock comprising
   A) an input feed hopper system to accept and store feedstock which provides means to block air from entering the device and prevent pyro-gas from leaking out;
   B) a primary auger contained within a reactor tube which accepts feedstock from said input feed hopper system and transports it through;
   C) an oven where heat is generated by combusting pyro-gas to heat said reactor tube containing said feedstock, said feedstock attaining sufficient temperature to be converted to char and volatiles;
   D) a pressure air-blower-Venturi system that directs the volatiles from the reactor tube exit to the oven via a pyro-gas transfer region, said pressure air-blower-Venturi system also providing combustion air;
   E) a char receptor-char auger extraction system which moves resulting char to a final char output hopper while also blocking air from entering said oven, reactor tube and char system and blocking resulting pyro-gas from leaking out of the char system; and
   F) a sensor computer control system programmed to set the reactor tube temperature within the range of about 500-1100° C., said sensor computer control system automatically adjusting the amount of air delivered by said pressure air-blower-Venturi system and the rotation rate of said primary auger to process said feedstock at the desired temperature-time sequence, and said sensor computer control system being programmed to periodically reduce the rotational rate of said primary auger and/or adjust the amount of air delivered by the pressure air-blower-Venturi system so as to move the flame front to the region connecting the exit of the reactor tube with the oven so as to burn out any carbon or tar deposits in the pyro-gas transfer region.

14. The device of claim 13 further comprising a propane or natural gas burner located within said oven.

15. The device of claim 13 wherein a combination of auger flight pitches, diameters and internal pipe diameters are able to process organic materials with particle sizes able to pass a ½ square inch screen, limiting the inflow of air into the reactor tube and char system, thereby avoiding the need for an entrance lock hopper or rotary valve.

16. The device of claim 13 wherein a combination of auger flight pitches, diameters and internal pipe diameters are able to transport and size reduced char produced from a great diversity of feedstock while forming a dense plug before the exit capable of limiting the inflow of air into the reactor tube and char system, while permitting the delivery of the output char particles to an open container thereby avoiding the need for an exit lock hopper or rotary valve.

17. The device of claim 13 wherein said sensor computer control system co-ordinates said char-auger extraction system with said primary auger to block the passage of pyro-gas out of the char exit or air into the char exit, thus avoiding excessive char buildup in the char receptor.

18. The device of claim 13 wherein said sensor computer control system co-ordinates the filing rate of said input feed hopper system such that channels do not develop, thereby preventing significant air flow from entering through said feed hopper and preventing pyro-gas from escaping through said feed hopper.

19. The device of claim 13 wherein said primary auger is an annular auger containing therein a hollow tube, and said oven is located with said hollow tube, thereby providing a large heat transfer surface to said feedstock traveling through said reactor tube, permitting thereby a higher output of heat and char where the transport volume, V, can be calculated by the equation $$V=(\pi/4)(D_a^2-D_s^2)P-t_h(D_a-D_s)(P^2+(\pi^2 D_s^2))^{1/2}/2$$

where $D_a$ is the diameter of the auger, $D_s$ the diameter of the pipe shaft, P is the pitch and the average flight thickness.

20. The device of claim 19 wherein additional heat is applied to the exterior surface of said reactor tube.

21. The device of claim 20 wherein said additional heat is generated by burning or heating gas.

* * * * *